US011975230B2

(12) United States Patent
Villeneuve et al.

(10) Patent No.: US 11,975,230 B2
(45) Date of Patent: May 7, 2024

(54) USER CONFIGURABLE LONG-RANGE FIRE-FIGHTING APPARATUS

(71) Applicant: ENTREPRISE DRAGO-I.S.I. INC., Repentigny (CA)

(72) Inventors: Simon Villeneuve, Blainville (CA); Eric Bedard, Sainte-Therese (CA)

(73) Assignee: ENTREPRISE DRAGO-I.S.I. INC., Repentigny (CA)

(*) Notice: Subject to any disclaimer, the term of this patent is extended or adjusted under 35 U.S.C. 154(b) by 667 days.

(21) Appl. No.: 17/076,518

(22) Filed: Oct. 21, 2020

(65) Prior Publication Data

US 2021/0113873 A1 Apr. 22, 2021

Related U.S. Application Data

(60) Provisional application No. 62/923,897, filed on Oct. 21, 2019.

(51) Int. Cl.

| | |
|---|---|
| ***A62C 99/00*** | (2010.01) |
| ***B05B 1/26*** | (2006.01) |
| ***B05B 7/00*** | (2006.01) |
| *A62C 27/00* | (2006.01) |

(52) U.S. Cl.

CPC .......... *A62C 99/0072* (2013.01); *B05B 1/265* (2013.01); *B05B 7/0075* (2013.01); *B05B 7/0081* (2013.01); *A62C 27/00* (2013.01)

(58) Field of Classification Search

CPC ... A62C 27/00; A62C 99/0072; B05B 7/0075; B05B 7/0081; B05B 1/26; B05B 1/262; B05B 1/265; B05B 1/267

USPC .......................................... 239/498, 518, 522

See application file for complete search history.

(56) References Cited

U.S. PATENT DOCUMENTS

| | | | | | |
|---|---|---|---|---|---|
| 1,805,782 | A * | 5/1931 | Munz | B05B 1/267 239/524 |
| D260,169 | S * | 8/1981 | Vikre | D23/214 |
| 5,848,752 | A * | 12/1998 | Kolacz | A62C 31/12 169/14 |

(Continued)

FOREIGN PATENT DOCUMENTS

CA 2810080 A1 9/2014

*Primary Examiner* — Jason J Boeckmann

(74) *Attorney, Agent, or Firm* — Jacob M. Ward; Ward Law Office LLC

(57) ABSTRACT

There is described a fire-fighting apparatus comprising a housing comprising an upstream air inlet and a downstream fire-extinguishing stream outlet and a hollow body therebetween, wherein the housing houses an air stream traveling at high velocity; and a spray assembly concentrically mounted to the housing. The spray assembly comprises a fluid inlet connected to a source of fluid outside the housing; and a plurality of injecting assemblies fluidly connected to the fluid inlet and designed for breaking down an inflow of the fluid into droplets and projecting the droplets of the fluid within the air stream in a multiphase fire-extinguishing stream. The injecting assemblies each comprises a fluid outlet; a base plate through which extends the fluid outlet; a holding structure mounted to the base plate and extending downstream therefrom, and a unibody jet-fragmenting device mounted to the holding structure facing the stream of fluid exiting the fluid outlet.

5 Claims, 15 Drawing Sheets

(56) References Cited

U.S. PATENT DOCUMENTS

2010/0065656 A1 * 3/2010 Grant .................... B05B 3/0486
239/231

* cited by examiner

USER CONFIGURABLE LONG-RANGE FIRE-FIGHTING APPARATUS

CROSS-REFERENCE TO RELATED APPLICATION

This application claims priority from U.S. provisional patent application 62/923,897 filed Oct. 21, 2019, the specification of which is hereby incorporated herein by reference in its entirety.

BACKGROUND

(a) Field

The subject matter generally relates to fire-fighting equipment. More specifically, but not exclusively, the subject matter relates to apparatus for generating water droplets projected in a strong configurable airflow.

(b) Related Prior Art

Projecting water on burning material is a common way of lowering the temperature of a blazing mass to extinguish a fire. However, directing a heavy jet of water to the base of a fire is not a very efficient way of fighting the fire. An indication of that is the large volume of water surrounding a site after fighting a fire and causing damages to the remaining structures. Indeed, one of the most helpful properties of water for extinguishing fire is its high heat absorption capacity, especially thanks to its unmatched evaporation latent heat. Therefore, water that does not evaporate is not used efficiently on top of being a source of collateral damages.

A strategy for using water with improved efficiency and accelerating fire extinguishing for a given water flow would be to split the flow into a large number of fine droplets spread over a large area of the blazing mass, so to promote rapid evaporation of the droplets as they approach or contact the blazing material, and prevent water from running and accumulating all around. Indeed, a large flow of water directed toward a concentrated location falls rapidly and a large proportion of the volume runs over the ground without wetting and cooling burning material and without evaporating. In order to provide an effective fire-fighting means, such water droplets must be projected over a sufficient range to reach the fire heat source. A long projection range is generally necessary to keep equipment and operators at a safe distance from the flames. Obstacles between the fire-fighting equipment and the blazing material may also contribute to keep equipment far from their target. Producing droplets in a proper size range to enable efficient fire-fighting and projecting said droplets in large volume over a long operating range represent a highly challenging objective.

It may also be desirable to produce a mist of water spread around a fire site over a shorter range to help cooling the surrounding atmosphere and fight the elevated heat affecting any person present in the vicinity. Moreover, projecting a water mist in a directed airflow is known to help repel smoke for additional benefits such as improving visibility and dissipating hazardous vapors, gasses and aerosols.

Therefore, a mobile apparatus for generating a powerful air stream and water droplets in a combined flow can be a powerful tool for fire-fighting. It would also be desirable that such an apparatus enable directing and concentrating the flow to reach the zones of interest in spite of site factors such as distance and wind. It would further be desirable to enable rapid reconfiguration of the apparatus to produce droplets of different sizes with different dispersion patterns to address different needs such as fire extinguishing, air-cooling or smoke repelling, in a rapid and user friendly manner and providing reliable operation regardless of constrains such as freezing temperature and wet environment.

Different types of apparatuses comprising an air blower combined with a mist-generating device for fire-fighting have been provided in the prior art. However, the prior art devices fail to provide true fire extinction capability combining long-range projection, dispersion pattern reconfiguration, adaptability to different fire-fighting media and reliability under harsh operating conditions.

There is therefore a need to provide a user configurable long-range fire-fighting apparatus, a spray assembly and a droplet-generating nozzle that obviate the limitations and drawbacks of the prior art devices.

SUMMARY

It is an object of the present disclosure to provide a user configurable long-range fire-fighting apparatus capable of producing and projecting a high-flow droplet stream of fire-extinguishing fluid over a long distance thanks to a modular spray assembly, long range low dispersion droplet injecting assemblies and a user configurable continuously adjustable stream concentrating flap system.

According to an embodiment, there is provided a fire-fighting apparatus comprising: a housing comprising an upstream air inlet and a downstream fire-extinguishing stream outlet and a hollow body therebetween, wherein the housing provides passage to an air stream traveling at high velocity; a spray assembly concentrically mounted to the housing, the spray assembly comprising: a fluid inlet connected to a source of fluid outside the housing; and a plurality of injecting assemblies fluidly connected to the fluid inlet and designed for breaking down an inflow of the fluid into droplets and projecting the droplets of the fluid within the air stream in a fire-extinguishing stream, at least one of the injecting assemblies comprising: a fluid outlet; a base plate through which extends the fluid outlet; a holding structure mounted to the base plate and extending downstream therefrom, and a unibody jet-fragmenting device mounted to the holding structure facing the stream of fluid exiting the fluid outlet.

According to an aspect, the unibody jet-fragmenting device comprises an elongated conical body having a peripheral surface.

According to an aspect, the peripheral surface of the jet-fragmenting device has a non-constant diameter, wherein said diameter follows an exponential function.

According to an aspect, the jet-fragmenting device comprises an apex facing the fluid outlet; a base at an end of the jet-fragmenting device which is opposite the apex; and a series of channels inset in the peripheral surface from the base to an intermediary position between the apex and the base.

According to an aspect, the peripheral surface of the jet-fragmenting device has a non-constant diameter defining a slope varying along the peripheral surface, the slope increasing from an apex slope about the apex to a base slope about the base of the jet-fragmenting device.

According to an aspect, the apex slope is less than five (5) degrees.

According to an aspect, the base slope is between 10 and 25 degrees.

According to an aspect, the jet-fragmenting device wherein the peripheral surface at the base has a circumference and the channels are radially and equidistant disposed along the circumference of the peripheral surface at the base.

According to an aspect, the channels comprise a floor, wherein the floors of the channels are adjoining a virtual frusto-conical volume.

According to an aspect, the virtual frusto-conical volume is oriented invertedly to the conical body of the peripheral surface.

According to an aspect, the virtual frusto-conical volume has an angle of between 10 and 20 degrees.

According to an aspect, the jet-fragmenting device has a first length, the channels have a second length, and wherein a ratio of the second length over the first length is between 10% and 40%.

According to an aspect, the jet-fragmenting device comprises a base having a circumference, and wherein the peripheral surface about the base features channels along arcs of between 12 and 25 degrees.

According to an aspect, the channels have a length and a width and wherein the width is constant over the length of the channels.

According to an aspect, the jet-fragmenting device comprises a base, and a fixing component located at the base.

According to an aspect, the holding structure comprises a pair of arms and a transversal component connecting the arms distant from the fluid outlet.

According to an aspect, the fire-fighting apparatus further comprises a grid plate mounted to the holding structure downstream to the jet-fragmenting device.

According to an aspect, the unibody jet-fragmenting device comprises an elongated conical body having a peripheral surface, and wherein the peripheral surface of the jet-fragmenting device has an average slope and wherein the arms have an arm angle in-between with half of the arm-angle being between 90% and 115% of the average slope of the peripheral surface of the jet-fragmenting device.

According to an embodiment, there is provided a jet-fragmenting device to be mounted downstream from a fluid outlet of a fire-fighting apparatus, comprising: an elongated conical body having a peripheral surface; an apex facing the fluid outlet; a base at an end of the jet-fragmenting device which is opposite the apex; and channels radially inset in the peripheral surface about the base, each of the channels comprising a floor, wherein the floors of the channels are adjoining a virtual frusto-conical volume oriented invertedly to the conical body of the peripheral surface.

According to an aspect, the jet-fragmenting device comprises between 10 and 15 of the channels.

According to an embodiment, there is provided a fire-fighting apparatus comprising a) a housing comprising an upstream air inlet and a downstream fire-extinguishing stream outlet and a hollow body therebetween, wherein the housing houses an air stream traveling at high velocity; b) an injecting assembly mounted into the housing, the injecting assembly comprising: i) a fluid inlet connected to a source of fluid outside the housing; and ii) a fluid outlet fluidly connected to the fluid inlet, downstream from the blower, designed for breaking down an inflow of the fluid into droplets and projecting the droplets of the fluid within the air stream in a multiphase fire-extinguishing stream; and c) a user configurable flap system mounted about and extending downstream from said downstream fire-extinguishing stream outlet. The flap system comprises a plurality of flaps hingedly mounted side by side to the housing; and a peripheral ring rotatable around the housing connected to the flaps compelling inclination of the flaps upon rotation, whereby a dispersion pattern is set.

According to an aspect, the flaps of the fire-fighting apparatus comprise a flexible part mounted to a substantially rigid trapezoidal plate.

According to an aspect, the flexible part of the flaps is inwardly oriented relative to a frusto-conical funnel surface defined by the inner faces of the substantially rigid trapezoidal plates, and the flexible parts are overlapping partially the inner face of a neighbor substantially rigid trapezoidal plate.

According to an embodiment, there is provided a user configurable long-range fire-fighting apparatus comprising i) a positive-pressure high-velocity blower mounted in a housing having an upstream air inlet and a downstream generally circular outlet defining a peripheral ring, for generating a fire-extinguishing stream at said outlet; ii) a user replaceable high-flow spray assembly concentrically mounted in said housing and comprising a plurality of low dispersion droplet generating injecting assemblies for generating and projecting fire-fighting fluid droplets within said air stream to form a multiphase fire-extinguishing stream, and iii) a user configurable flap system mounted about and extending downstream from said peripheral ring to modify a dispersion pattern of said multiphase fire-extinguishing stream.

According to an aspect, the spray assembly comprises water-fragmenting droplet generating (standard) injecting assemblies.

According to an aspect, the spray assembly comprises foam-forming jet-fragmenting droplet generating (foam) injecting assemblies.

According to an aspect, the spray assembly comprises a main fire-fighting fluid inlet pipe having a quick coupling for mating with an outlet of a fire-fighting fluid feed pipe of the fire-fighting apparatus, so to enable quick user operable connection and disconnection of the head assembly for substitution or replacement.

According to an aspect, the droplet-generating injecting assemblies are positioned at substantially equal distance from each other.

According to an aspect, each one of the droplet-generating injecting assemblies comprises a generally conical elongated jet-fragmenting device defining a downstream end portion provided with a plurality of peripheral axially extending channels.

According to an aspect, each one of the droplet-generating injecting assemblies comprises a body supporting the jet-fragmenting device and further adapted to support a grid plate downstream from the jet-fragmenting device.

According to an aspect, each one of the droplet-generating injecting assemblies comprises a generally circular grid plate mounted downstream from said jet-fragmenting device and having a mesh size adapted to convert affluent airborne droplets into fire-fighting foam.

According to a still further embodiment, there is provided a long-range low-dispersion spray injecting assembly wherein the elongated jet-fragmenting device has an apex angle of less than about fifteen (15) degrees.

According to an aspect, the spray assembly is designed to mount at least two (2) types of droplet-generating injecting assemblies having different droplet generation and dispersion characteristics.

According to an aspect, the flap system comprises a plurality of adjustable stream deflecting flaps individually hingedly assembled to a fixed supporting ring mounted to the outlet peripheral ring, said flaps being further connected through individual links to a rotating ring mounted concentric to the fixed ring, whereby radial rotation of the rotating ring causes flaps to simultaneously pivot to adjust the inclination thereof for in turn enabling change of the dispersion pattern.

According to an aspect, the rotating ring is rotated using a single actuator that can be electrically controlled by the user to selectively configure the inclination of the flap and the dispersion pattern.

According to an aspect, the flaps comprise a substantially rigid part and a coextending adjacent substantially flexible part, the flexible part being adapted to close a gap between rigid parts of the flaps, whereby a closed frusto-conical configuration of the flap system may be maintained regardless of the inclination of the flaps.

According to an aspect, the flaps define a trapezoidal surface having a curvilinear upstream edge and a curvilinear downstream edge narrower than the upstream edge and having curvature angle less that the upstream edge, whereby a flap can form a frusto-conical funnel surface configuration having a generally circular upstream inlet edge and a generally circular downstream edge of a smaller diameter.

According to a further embodiment, there is provided a long-range low-dispersion droplet-generating injecting assembly comprising a body defining an inlet bore and an outlet, an elongated generally conical jet-fragmenting device having a plurality of radial axially inset channels at a downstream end thereof and a holding structure to mount jet-fragmenting devices downstream from the outlet.

According to an aspect, the droplet-generating injecting assembly further comprises a foam-generating grid plate mounted downstream from the jet-fragmenting device and transversal to a longitudinal axis of the jet-fragmenting device.

According to an embodiment, there is provided a fire-fighting vehicle comprising a user configurable long-range fire-fighting apparatus comprising i) a positive pressure high-velocity blower mounted in a housing having an upstream air inlet and a downstream generally circular outlet defining a peripheral ring, for generating a fire-extinguishing stream at said outlet; ii) a user replaceable high-flow spray assembly concentrically mounted in the housing and comprising a plurality of low dispersion droplet generating injecting assemblies for generating and projecting fire-fighting fluid droplets within said air stream to form a multiphase fire-extinguishing stream, and iii) a user configurable flap system mounted about and extending downstream from said peripheral ring to modify a dispersion pattern of said multiphase fire-extinguishing stream.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
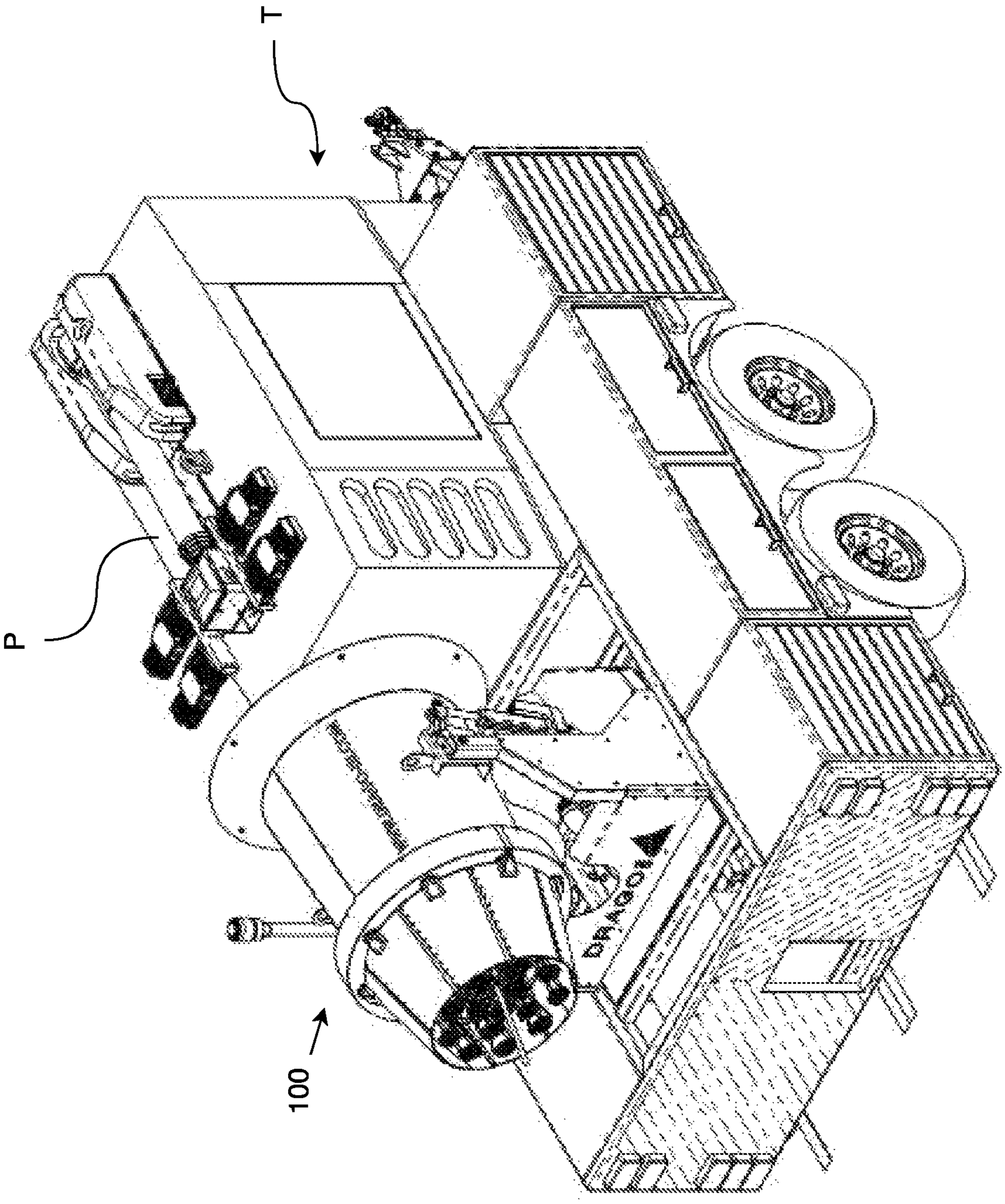
FIG. 1 is an isometric view of a user configurable long-range fire-fighting apparatus mounted on a mobile platform, aka trailer, according to an embodiment.

In non-restrictive illustrative embodiment there are disclosed a user configurable long-range fire-fighting apparatus comprising a user replaceable modular high-flow multi-nozzle spray assembly, a long-range low-dispersion droplet generating nozzle assembly and a user configurable fluid-deflecting flap system for providing in a selectively adjusting dispersion pattern a multiphase fire-fighting fluid stream.

The realizations will now be described more fully hereinafter with reference to the accompanying figures, in which realizations are illustrated. The foregoing may, however, be embodied through many different realizations and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term “or” should generally be understood to mean “and/or” and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words “about”, “approximately”, or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language (“e.g.,” “such as”, or the like) provided herein, is intended merely to better illuminate the exemplary realizations and does not pose a limitation on the scope of the realizations. No language in the specification should be construed as indicating any unclaimed element as essential to the practice of the realizations. The use of the term “substantially” is intended to mean “for the most part” or “essentially” depending on the context. It is to be construed as indicating that some deviation from the word it qualifies is acceptable as would be appreciated by one of ordinary skill in the art to operate satisfactorily for the intended purpose.

In the following description, it is understood that terms such as “first”, “second”, “top”, “bottom”, “above”, “below”, “front”, “rear”, “upstream”, “downstream” and the like, are words of convenience and are not to be construed as limiting terms.

The terms “top”, “up”, “upper”, “bottom”, “lower”, “down”, “vertical”, “horizontal”, “interior” and “exterior” and the like are intended to be construed in their normal meaning in relation with normal installation of the product. More precisely, the term “longitudinal” refers to an orientation parallel to the longitudinal orientation of a leg when in use. The term “transversal” refers to the perpendicular orientation with respect to the longitudinal.

It should further be noted that for purposes of this disclosure, the term “coupled” means the joining of two members directly or indirectly to one another. Such joining may be stationary in nature or movable in nature and/or such joining may allow for the flow of fluids, electricity, or electrical signals between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

In realizations, there are disclosed components of a user configurable long-range fire-fighting apparatus.

It will be noted that throughout the appended drawings, like features are identified by like reference numerals.

The following disclosure describes an apparatus for generating, projecting, directing and concentrating a multiphase (generally air and liquid) stream to reach zones of interest within or around a fire in spite of site factors such as distance and wind. The apparatus enables quick user operable changeover of a spray assembly to select from water droplet generation or foam generation so to rapidly configure the apparatus for different needs.

Indeed, those of ordinary skills in the art will appreciate that, for some types of fires such as fires involving electrical equipment or fires involving some chemical compounds, water may be substituted with more suitable types of liquid extinguishing agents, for example liquids that may transform into foam with variable expansion rates when exposed to ambient air. Such fire-fighting foams may comprise class A foams used to fight wildfires such as those involving class A fuels (ordinary combustibles), or may comprise class B foams designed to contain the explosive vapors produced by flammable liquids.

The fire-fighting apparatus further features user configurable fluid stream dispersion patterns to adapt to operating and behavior variables or applications such as fire extinguishing, air-cooling or smoke repelling. In an embodiment, a fire-fighting apparatus comprises a housing having an upstream air inlet and a downstream circular fire-extinguishing stream outlet defining a peripheral ring. The air inlet is operably connected to an airflow source, which may be a positive pressure blower typically mounted in the housing. The airflow source generates an air stream travelling in the housing and exiting the housing through the outlet with a user-defined dispersion pattern. Water droplets generating jet-fragmenting assemblies are mounted at various radial positions near the outlet for projecting water droplets within the air stream. User adjustable fluid stream deflecting flaps are connected to a controllable actuating device and have one edge pivotally mounted adjacent to the outlet peripheral ring. A user may control the actuating device to adjust an angular position of the flaps, defined as an adjustable angle between a general surface of each flap and a surface of at a housing outlet of the apparatus, for in turn modifying the fluid stream dispersion pattern and thus the effective outlet diameter (aka area) of the apparatus.

FIG. 1 shows a perspective view depicting a user configurable long-range fire-fighting apparatus 100 according to an embodiment, mounted on a mobile platform such as a trailer T, wherein mounted to the trailer T provides the desired mobility to reach fire sites and to move the fire-fighting apparatus 100 on a fire-fighting site.

Figure 2:
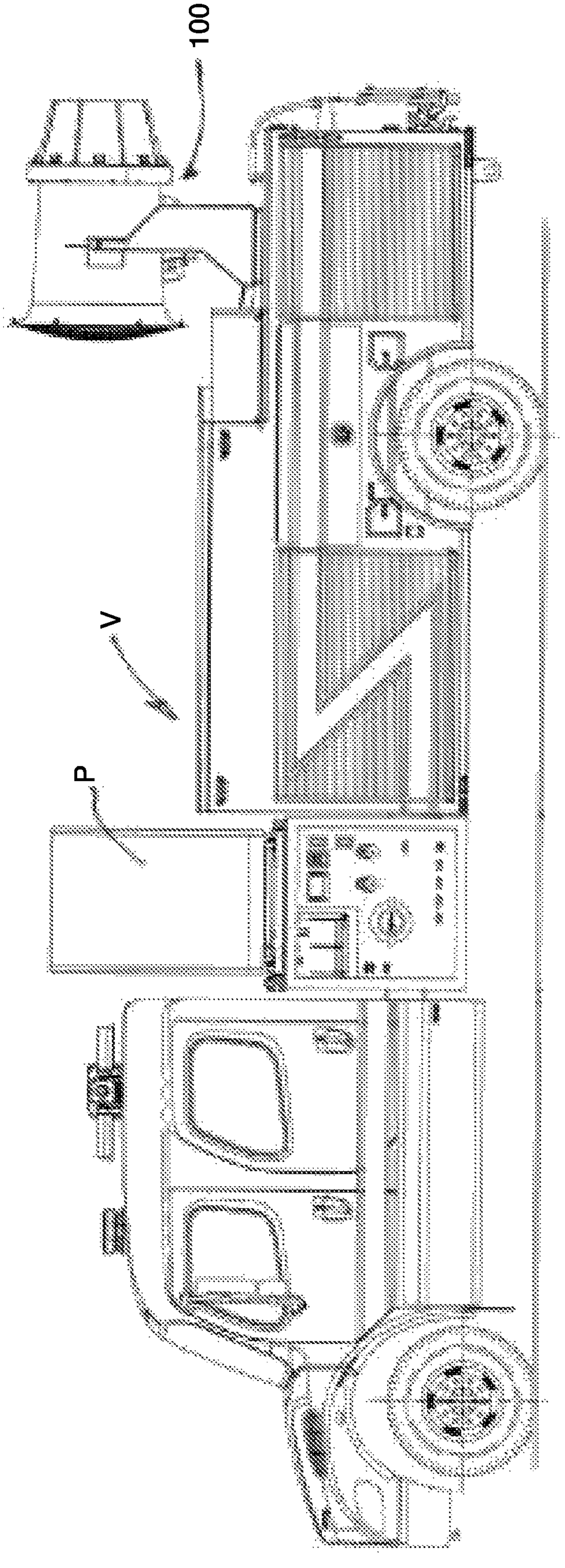
FIG. 2 is a side elevation view of a user configurable long-range fire-fighting apparatus mounted on a fire-fighting truck.

FIG. 2 shows the same fire-fighting apparatus 100 mounted on a fire-fighting vehicle V. Examples of FIGS. 1 and 2 provide examples that the fire-fighting apparatus 100 is designed to be mountable on different mobile platforms.

Further on FIGS. 1 and 2, a high-pressure high-flow fluid pump P, carried by the trailer T or the vehicle V, is connected to the fire-fighting apparatus 100 through a supply hose H feeding the fire-fighting apparatus 100 with fluid when in use. According to fire requirements, the fed fluid may be water or a mix of grade A fire-fighting foam and water, or a similar fire-fighting medium.

Figures 3A, 3B, 3C:
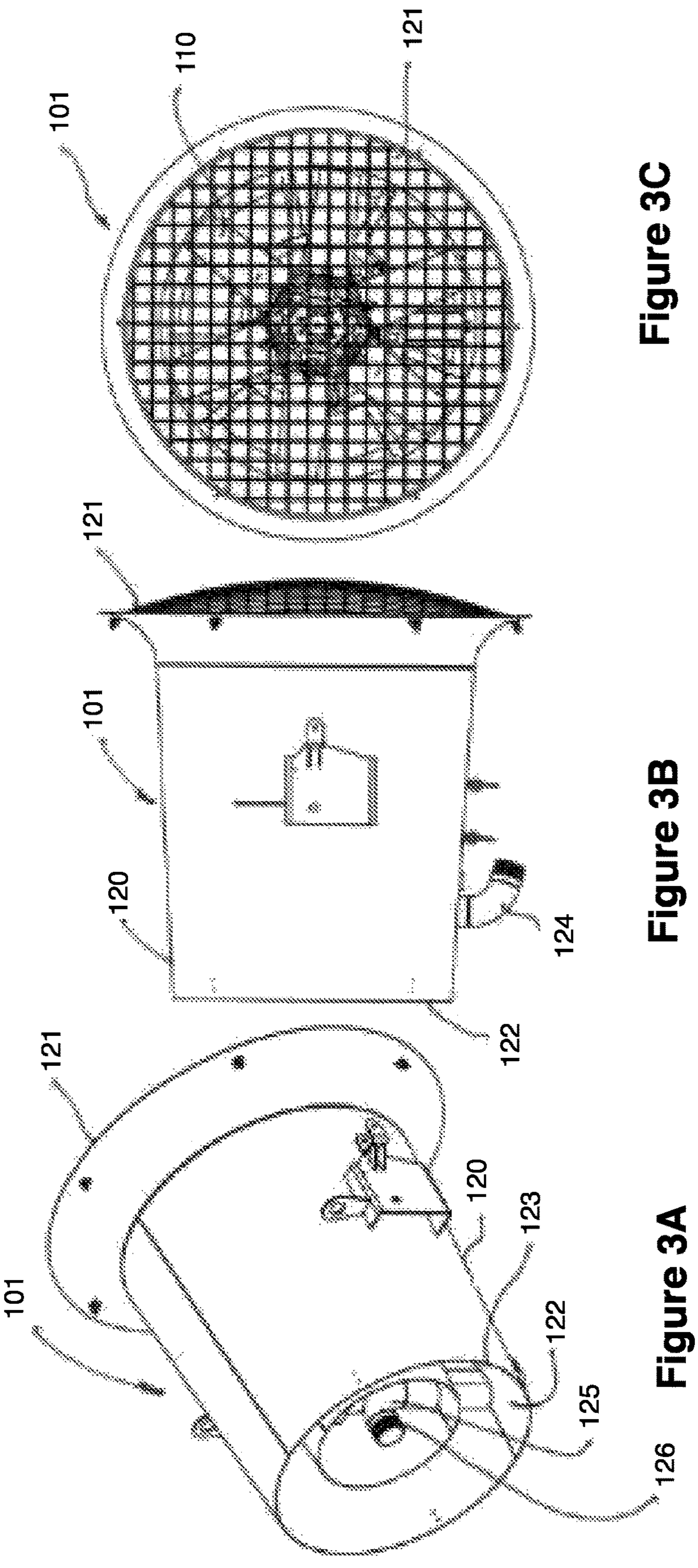
FIGS. 3A, 3B and 3C are respectively a front isometric view, a side elevation view, and a rear elevation view of a user configurable long-range fire-fighting apparatus.
Figure 4:
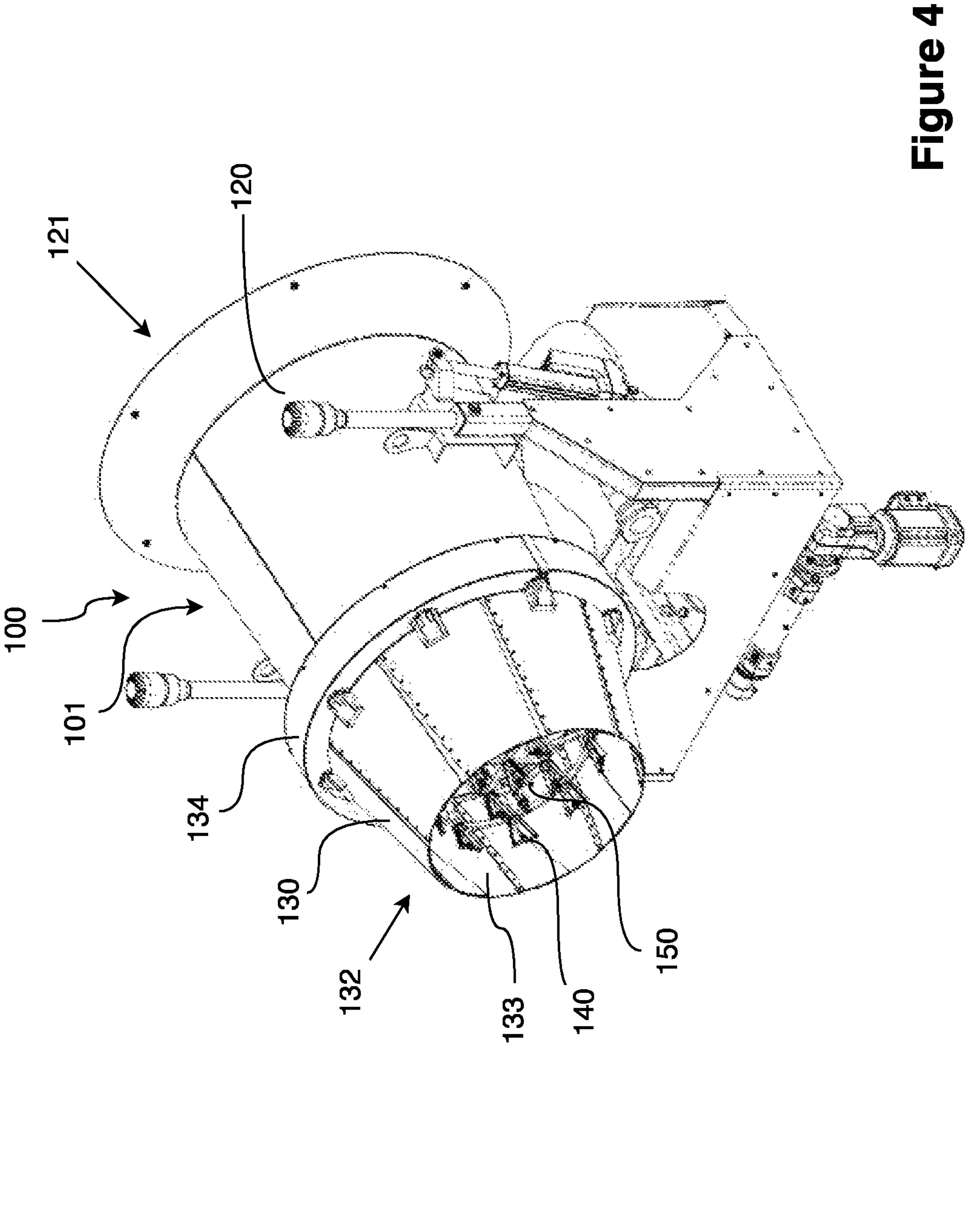
FIG. 4 is a front isometric view of a user configurable long-range fire-fighting apparatus with vehicle-mounting components according to an embodiment.

Referring to FIGS. 3A to 3C and FIG. 4, there is depicted a non-restrictive illustrative embodiment of a user configurable long-range fire-fighting apparatus 100. The views of FIGS. 3A-C show the core 101 of the fire-fighting apparatus 100 comprising a positive pressure air blower 110 mounted into a housing 120 having an upstream air inlet 121 and a downstream generally circular fire-extinguishing stream outlet 122, aka a downstream fire-extinguishing stream outlet 122, defining a peripheral ring 123, for delivering a fire-extinguishing stream (mix of air stream and droplets as explained hereinafter) through the fire-extinguishing stream outlet 122. The housing 120 provides a hollow space between the upstream air inlet 121 and the fire-fighting outlet 122 for the air stream and later the fire-extinguishing stream to travel therein at high velocity. There is further shown a fluid inlet 124 and a fluid outlet 125 ending with a mounting coupling 126.

Figure 5:
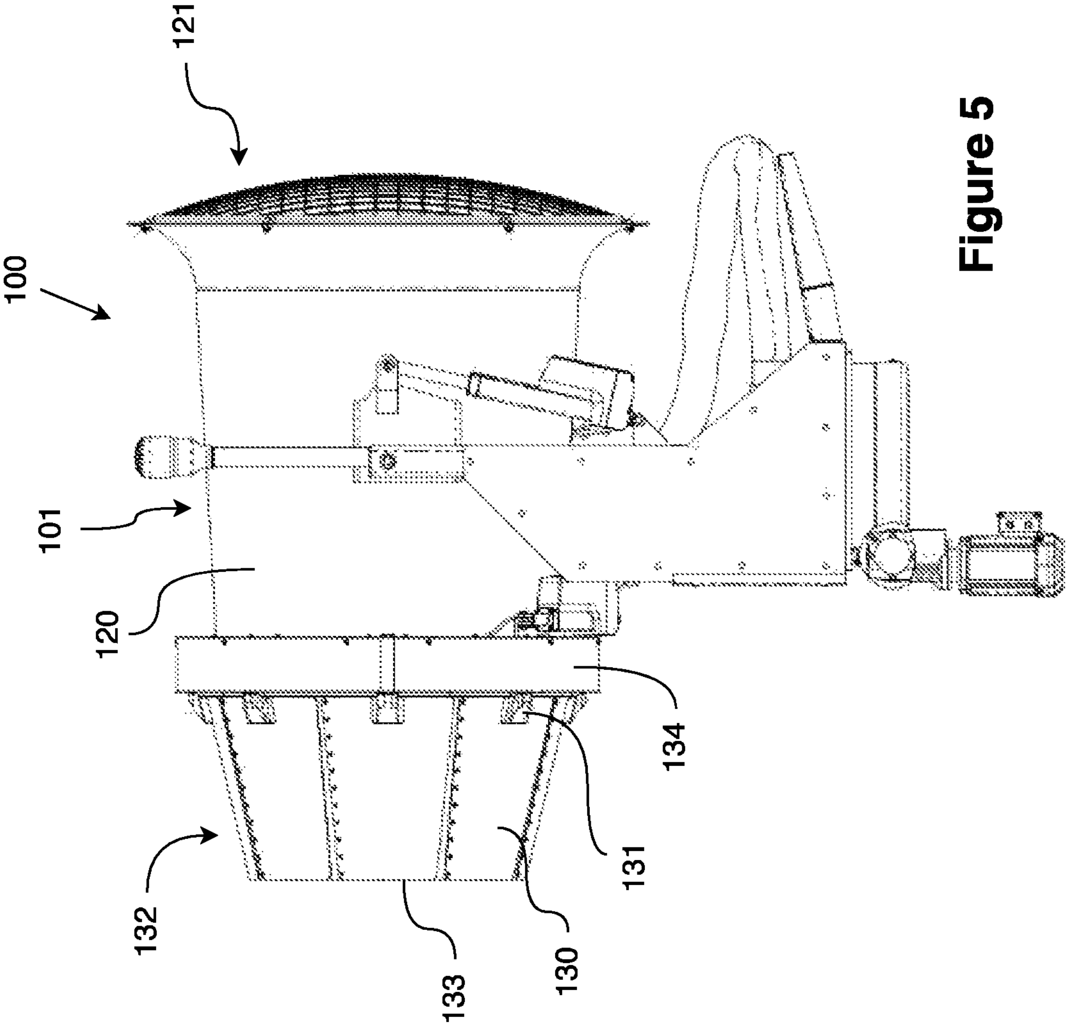
FIG. 5 is a side elevation view of the fire-fighting apparatus of FIG. 4.

Referring to FIG. 5, the fire-fighting apparatus 100 further comprises a plurality of adjustable, partly overlapping stream deflecting flaps 130, for example eight (8) flaps 130, hingedly mounted to the housing 120 about the peripheral ring 123 using hinges 131. The flaps 130 and hinges 131 are configured so that an edge of each flap 130 remains adjacent to, and substantially follows, the peripheral ring 123 (FIG. 4) of the outlet 122. The flaps 130 have a generally trapezoidal shape and have an arcuate cross section that defines, in co-operation, an adjustable converging or diverging funnel-like generally frusto-conical nozzle 132. The nozzle 132 thus mates with the outlet 122 of the fire-fighting apparatus 100 at one end and defines a variable circumference nozzle outlet 133 at an opposite distal end. The flap system 180 comprising the flaps 130 further comprises an actuating system 190, partly hidden by the cover 134 herein and that will be described in further detail referring to FIG. 11, that enables a user to jointly orient the flaps 130 and thereby to configure the nozzle 132 in a desired configuration, e.g., to configure the adjustment of a dispersion pattern and efficient range of the fire-extinguishing stream, in view of different operating conditions.

The flap system 180 allows a user to adjust the nozzle 132 and nozzle outlet 133 to exit a fire-extinguishing stream from the outlet 122 either into a divergent stream pattern or into a more focused stream pattern. The positive pressure blower 110 providing the high-velocity source of the fire-extinguishing stream may be driven by a variable speed, electric or hydraulic motor (not shown). The speed of the motor is typically controllable by a user, whereby they may adjust the blower 110 to produce an airflow ranging from about between 1,500 and 35,000 cubic feet per minute (CFM). Thereby, control over strength, range and dispersion pattern of the fire-extinguishing stream projecting from the nozzle outlet 133 is available to the user.

Figure 6B:
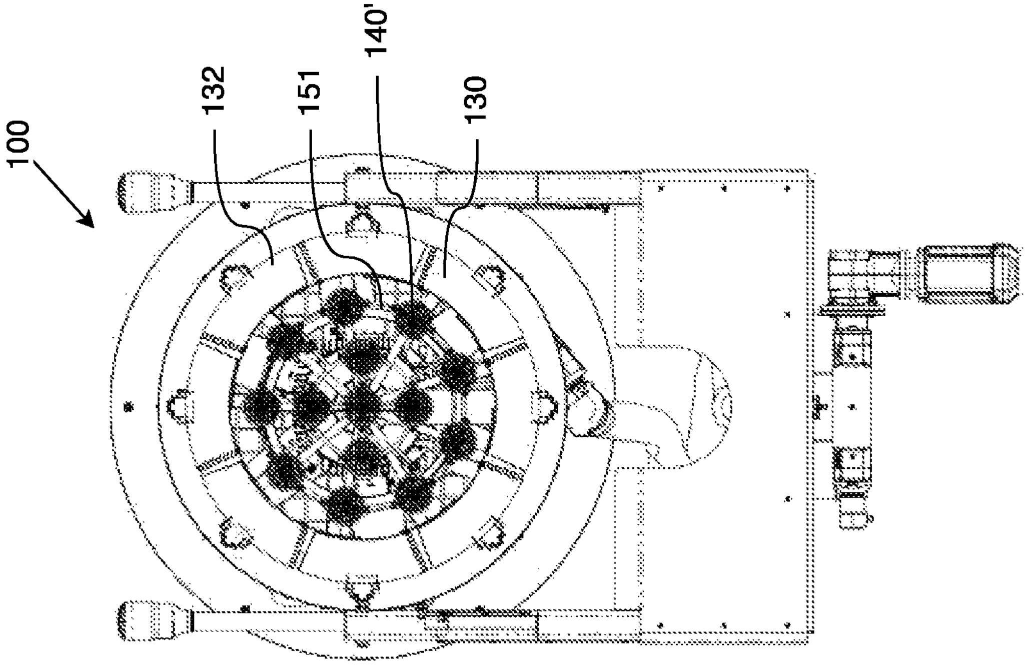
FIGS. 6A and 6B are respectively a front view of the embodiment of the fire-fighting apparatus of FIG. 4, and a front view of an alternate embodiment sharing many characteristics with the fire-fighting apparatus of FIG. 4 but equipped with an alternate multi-nozzle spray assembly.
Figure 6A:
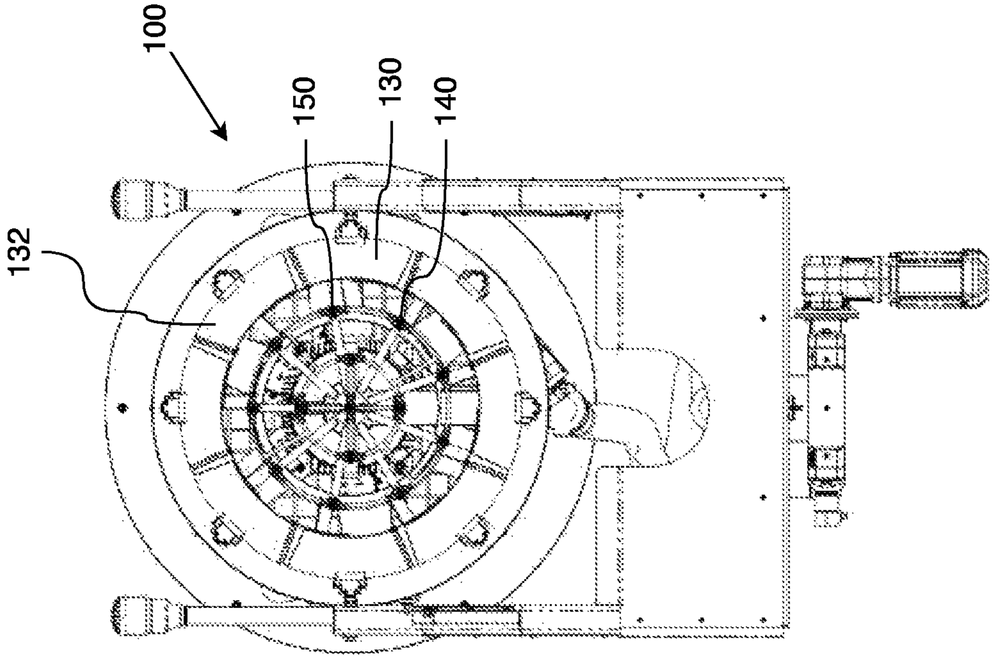
Figure 7B:
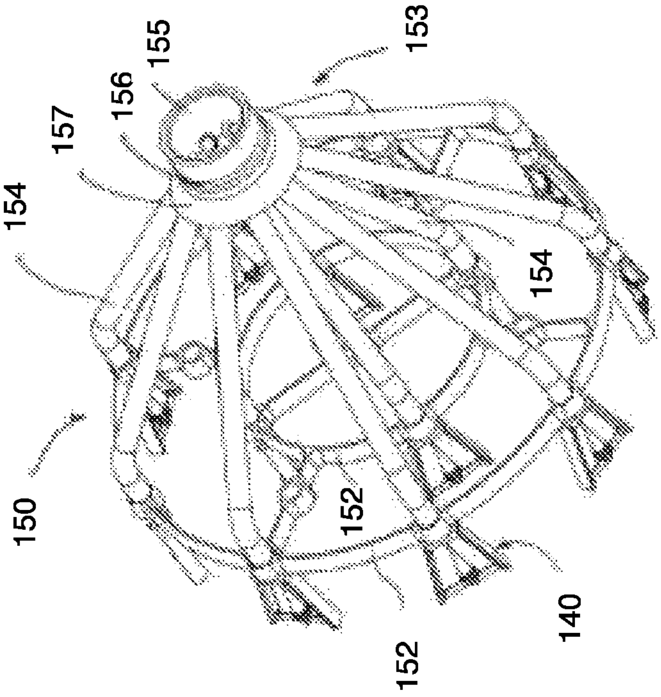
FIGS. 7A and 7B are respectively a front, aka downstream, isometric view and a rear, aka upstream, isometric view of a multi-nozzle spray assembly designed for water droplets generation.
Figure 7A:
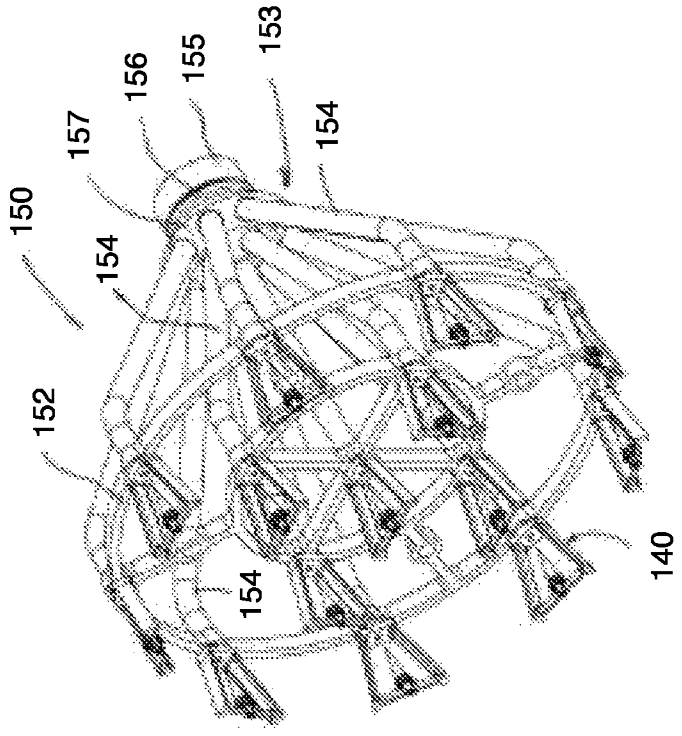
Figure 7D:
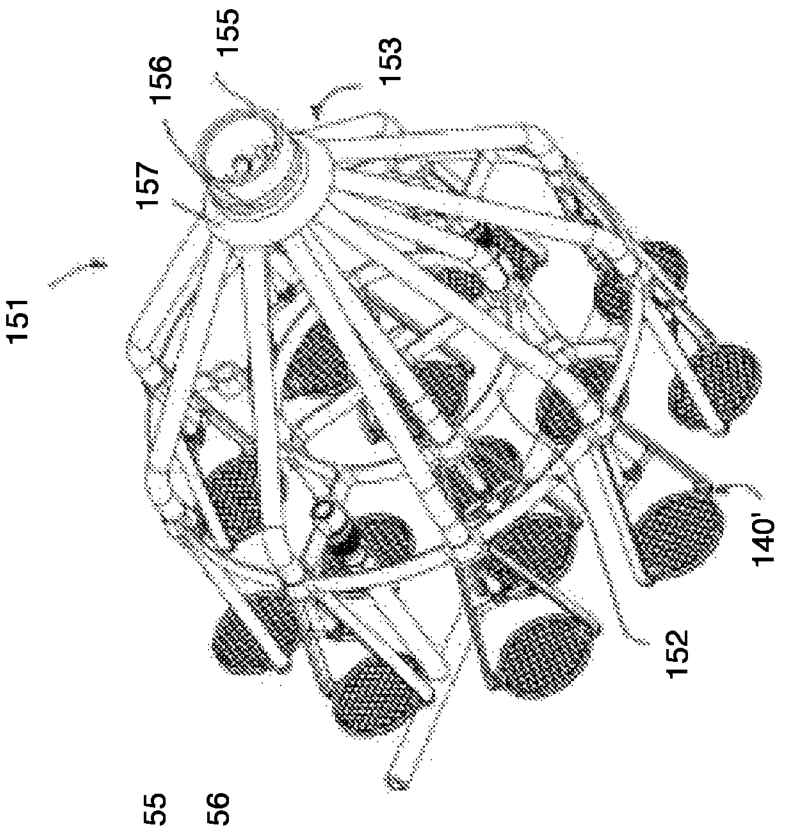
FIGS. 7C and 7D are respectively a front, aka downstream, isometric view and a rear, aka upstream, isometric view of a multi-nozzle spray assembly designed for foam-forming fluid droplets generation.
Figure 7C:
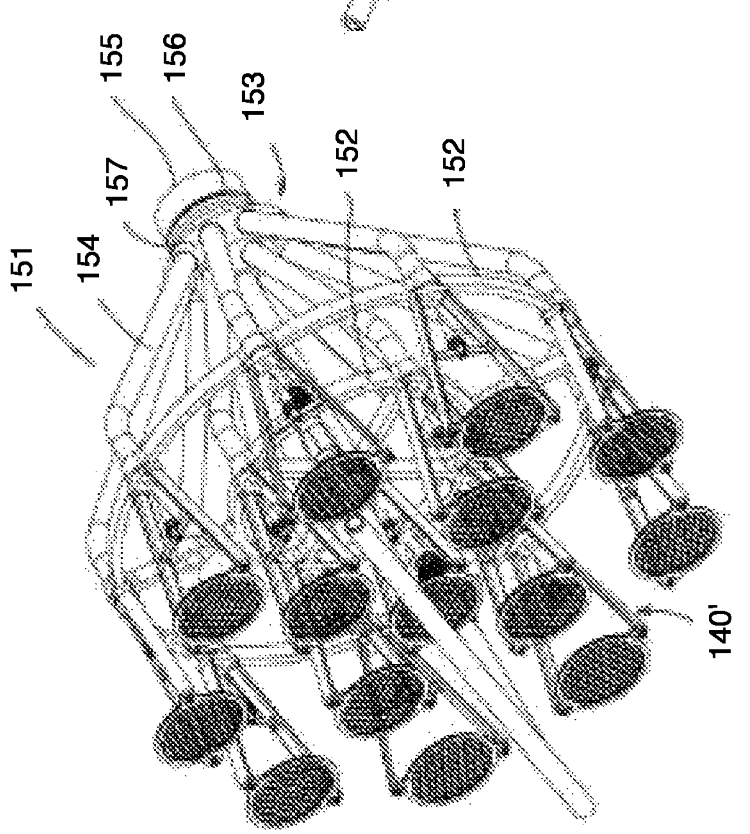

Referring now additionally to FIGS. 4, 6A, 6B, and 7A-7D, in order to provide a fire-extinguishing stream containing the fluid, such as water or fire-fighting foam, as required for performing various fire-fighting tasks, the fire-fighting apparatus 100 comprises a replaceable user mountable modular spray assembly 150 which, according to configurations, is adapted to generate and inject water droplets in the air stream, such as the spray assembly 150 depicted in FIG. 4, FIG. 6A, FIG. 7A and FIG. 7B, or adapted to generate and inject foam droplets (originating from a foam generating fluid) in the air stream see the spray assembly 151 depicted in FIG. 6B, FIG. 7C and FIG. 7D. The spray assemblies 150, 151 comprise a frame 152 adapted to support a plurality of low-dispersion droplets injecting assemblies 140 (for water droplets) or 140' (for foam droplets generation). The spray assemblies 150, 151 further comprise a manifold 153 comprising distribution tubular sections 154, aka feeding tubes, connecting a fluid inlet 157 to the individually injecting assemblies 140, 140'. The tubular sections 154 are connected to the fluid inlet 157 of the manifold 153 that is assembled to a fluid feed pipe 155 terminated by a mounting coupling 156 for convenient user operable assembly to the mounting coupling 126 of the fluid outlet 125. Thereby, a user can easily operate a spray assembly 150 changeover to adapt to different operation conditions, i.e., generation of water droplets or generation of foam droplets.

It is to be noted that different configurations of injecting assemblies are contemplated therethrough, wherein one configuration may be better adapted to a situation by providing different dispersion ranges, different droplet sizes, etc.

It is also to be noted that the mounting couplings 126 and 156 may be of any kind known in the art, such as twist-lock couplings, threaded couplings, etc.

In a preferred embodiment, the feed pipe 155 and the mounting coupling 156 are standard two and a half (2.5) inch diameter Storz type mounting fluid connection for quick detachable assembly to the mounting coupling 126 of tubular fluid outlet 125 centered in a throat of the fire-fighting apparatus 100 near the outlet 122. The tubular sections 154 are typically made to have an inside diameter of at least 0.55 of an inch for a manifold 153 providing a supply of up to 500 gallons per minute (GPM) to the injecting assemblies 140, 140' with minimal drop in pressure. The spray assemblies 150, 151 and droplets generating injecting assemblies 140, 140' are designed to handle operating pressures ranging between about 175 to 250 pounds per square inch (PSI) as provided by a typical onboard pump P.

The high-flow multi-nozzle spray assemblies 150, 151 are further typically designed to fit in the center of the outlet 122 of a fire-fighting apparatus 100 having a nominal diameter of 32 inches, with the typical fire-fighting apparatus 100 having its nozzle outlet 133 adjustable between about 26 inches and 32 inches. Such spray assemblies 150, 151 can fit in a fire-fighting apparatus 100 having a smaller nominal diameter down to about 24 inches, or in a fire-fighting apparatus 100 having a larger nominal diameter with slight modifications or no modifications.

According to a preferred embodiment, the low-dispersion injecting assemblies 140, 140' preferably have a k-factor in a range between about two (2) and four (4), and are mounted in a generally equally spaced pattern to provide substantially uniform flow distribution with minimal interaction between the jets generated by the individual injector assemblies 140, 140'. This range of k-factor is desired to meet the requirements in relation with the range, aka distance, reachable by the fire-extinguishing stream at targeted operating pressures with the preferred jet-fragmenting design.

Preferably, according to the hereinbefore provided dimensions, a number ranging between nine (9) and sixteen (16) injecting assemblies 140, 140' are part of the fire-fighting apparatus 100 so as to handle the rated flow. In the exemplary embodiments illustrated at FIGS. 6A-B and FIGS. 7A-D, a total of fourteen (14) injecting assemblies 140, 140' are provided. According to another embodiment (not shown) a total of thirteen (13) injecting assemblies 140, 140' are provided.

Figure 8A:
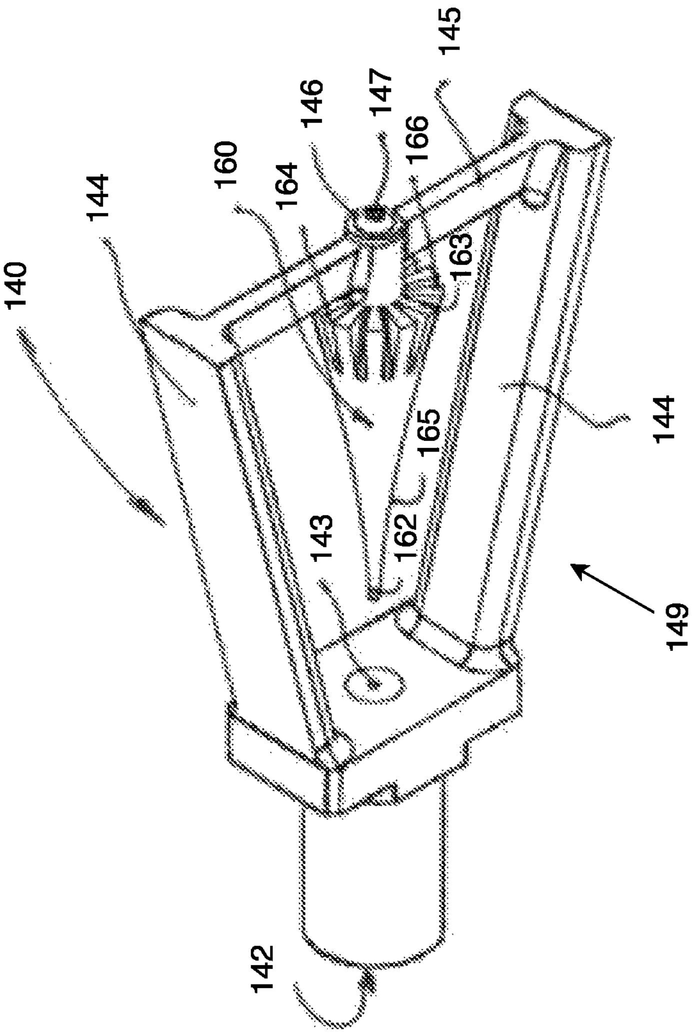
FIGS. 8A and 8B are respectively a front, aka upstream isometric view and a rear, aka downstream, isometric view of a low-dispersion water droplets generation injecting assembly part of the spray assembly of FIGS. 7A-B.
Figure 8B:
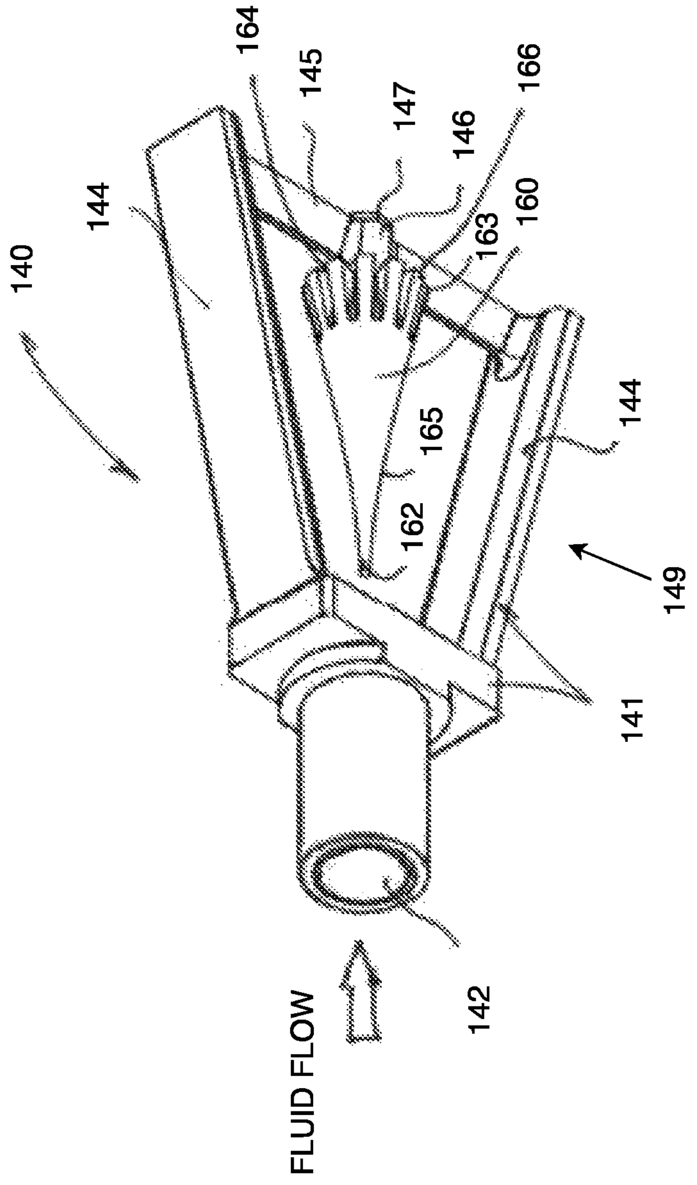

Referring now to FIGS. 8A and 8B, a standard low-dispersion fluid droplet-generating injecting assembly 140 is depicted. According to an example, the fluid comprises water. The injecting assembly 140 comprises a body 141 defining a fluid inlet bore 142, a fluid outlet 143, aka fluid outlet egress orifice, a jet-fragmenting device 160, aka an elongated jet-fragmenting device 160, downstream from the fluid outlet 143, and a holding structure 149 comprising supporting arms 144 and a cross member 145 for mounting the jet-fragmenting device 160. The cross member 145 comprises a center bore hole 146 to mount the jet-fragmenting device 160 to the cross member 145 using a fastener such as a screw 147, wherein the screw 147 is also screwed into threaded hole 161 of the jet-fragmenting device 160 (see FIGS. 10A and 10C). In operation, fire-fighting fluid is fed with a high speed flow rate, exiting from the fluid outlet 143 of each of the injecting assemblies 140 in a stream that hits the jet-fragmenting device 160, wherein the jet-fragmenting device 160 is designed to convert, aka break, the incoming jet of fluid into smaller jets, aka droplets or jets breakable into droplets, adapted to enable long-range transportation of the fluid in the airflow induced by the blower 110, thus generating, through the mix of air and droplets of fluid, the fire-extinguishing stream.

According to an embodiment, the diameter of the fluid outlet 143 is 0.312 inches. According to a realization, a single injecting assembly 140 provides a fluid flow of 47.7 gpm (gallons per minute) at 275 psi, or 668 gpm for a set of 14 injecting assemblies 140. According to another realization, a single injecting assembly 140 provides a fluid flow of 17 gpm at 50 psi, or 240 gpm for a set of 14 injecting assemblies 140.

According to yet another embodiment, the diameter of the fluid outlet 143 is 0.125 inches which reduces the fluid flow of each injecting assembly 140 as well as the size of the droplets exiting the fluid outlet 143. Injecting assemblies 140 having fluid outlets 143 of such a diameter are useful when the fire-fighting apparatus 100 delivering a fire-extinguishing stream is in autonomous mode (i.e., not connected to an external source of fluid). With such a diameter, a single injecting assembly 140 provides a fluid flow of 7.7 gpm at 275 psi, or 100 gpm for a set of 13 injecting assemblies 140. According to another realization, a single injecting assembly 140 provides a fluid flow of 3 gpm at 50 psi, or 40 gpm for a set of 13 injecting assemblies 140.

According to a preferred realization, the injecting assemblies 140 are designed to generate droplets that are sized to enable quick evaporation when approaching and/or contacting a fire, to rapidly absorb heat through the evaporation of the water droplets and to promote fire extinguishing and/or environment cooling.

Figure 9A:
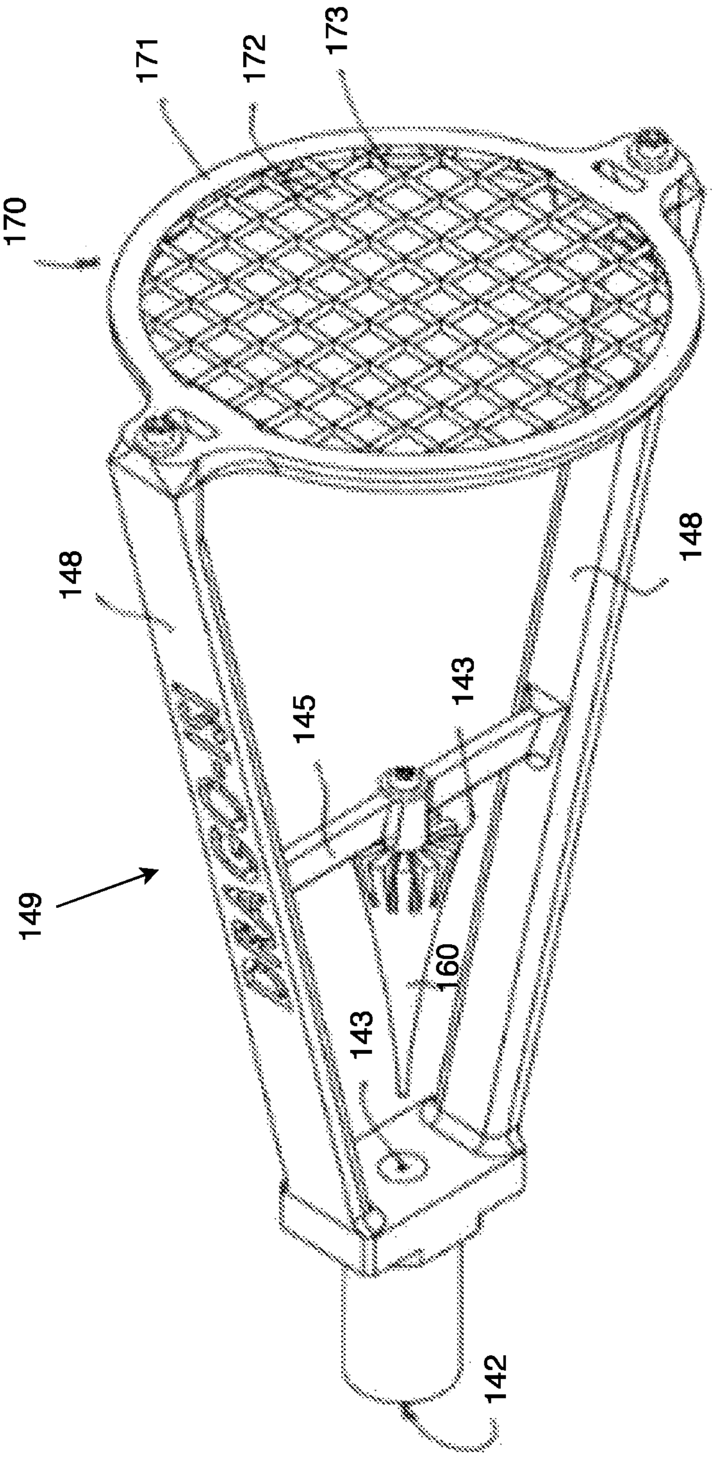
FIG. 9A and FIG. 9B are respectively a front, aka upstream, isometric view and a rear, aka downstream, isometric view of a low-dispersion water droplets generation injecting assembly part of the spray assembly of FIGS. 7A-B.
Figure 9B:
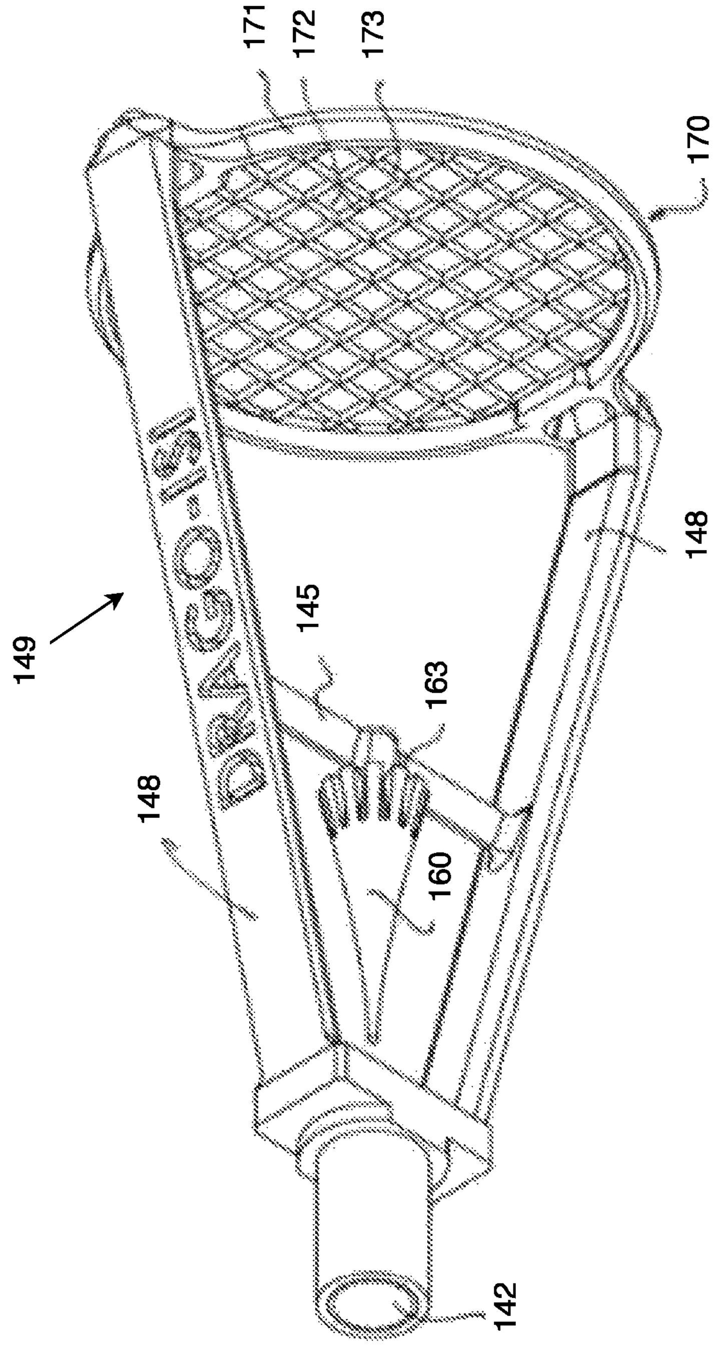

Referring now to FIGS. 9A to 9B, there is depicted dedicated an alternate embodiment of a low-dispersion droplet generating injecting assembly 140' adapted to foam-forming fluid droplets generation. With respect to the injecting assembly 140, the injecting assembly 140' differs at least its holding structure 149 comprising longer arms 148 enabling the additional holding of a foam impinging circular grid plate 170 that is mounted downstream from the downstream end 163 of the jet-fragmenting device 160. The grid plate 170 has a mesh size adapted to convert affluent airborne droplets flowing from the jet-fragmenting device 160 into fire-fighting foam precursor. The grid plate 170 has a mounting frame 171 provided with mounting holes (not identified) for screwing the grid plate 170 at the arms 148 downstream from the cross member 145. Typically, for use of a typical foam-forming fluid, the grid plate 170 has a thin inner grid 172 having a spacing of about twenty-seven hundredth (0.27) of an inch between the wires 173 and having a cross-section of about six hundredths (0.06) of an inch by about six hundredths (0.06) of an inch. The thickness of the grid plate 170 is typically about two-hundredth (0.2) of an inch and the outer diameter of the mounting frame 171 is about four (4) inches. Impingement of the foam-forming fluid droplets on the grid plate 170 improves fragmentation and mixing in the air into a foam precursor that mixes with the airflow from the blower 110 to provide a fire-fighting (foam) stream having optimal properties and having a long range of action.

Figure 10A:
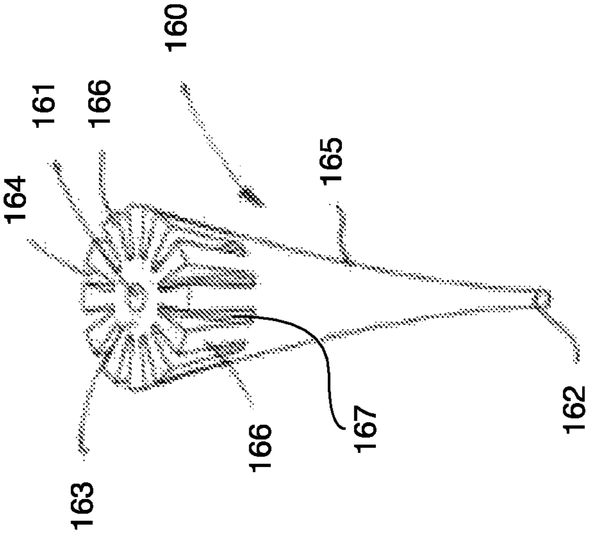
FIGS. 10A, 10B and 10C are respectively a rear, aka downstream, isometric view, a side view and a rear view of an elongated jet-fragmenting device substantially similar to the ones of the injecting assemblies shown in FIG. 8 and FIG. 9, wherein FIG. 10B feature a partial cross-section view according to the cross-section line C-C of FIG. 10C.
Figure 10C:
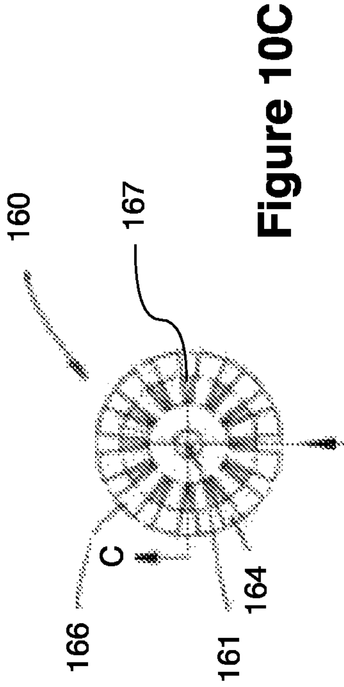
Figure 10B:
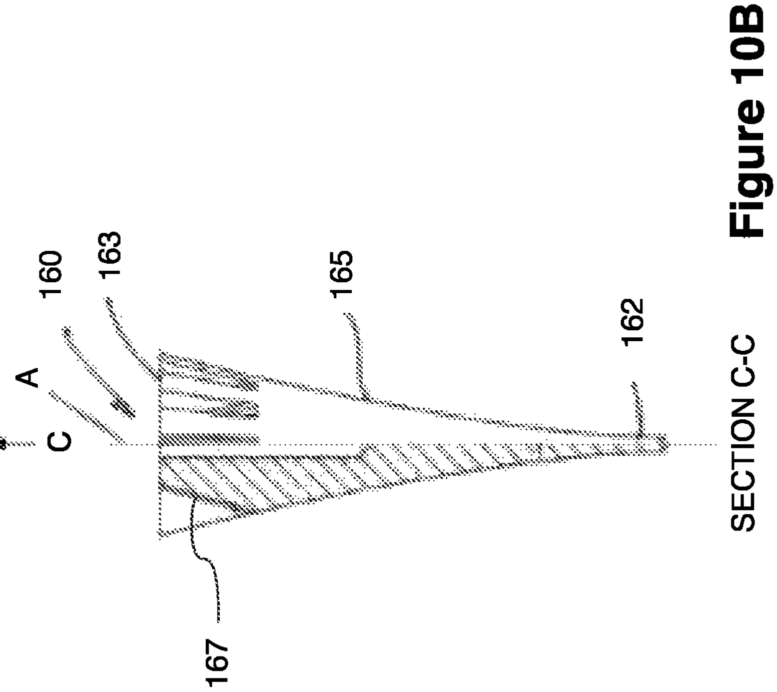

Referring now mainly to FIGS. 10A to 10C, there is depicted a unibody jet-fragmenting device 160 that has an elongated diverging generally conical shape having an acute angle upstream (aka proximal) apex end 162 facing the fluid jet from fluid outlet 143 and a circular downstream (aka distal) end 163. Shape and size of the apex end 162, i.e., its sharp/pointed (with a rounded end) spike shape, help to prevent gathering debris thereon.

The jet-fragmenting device 160 features, about the downstream end 163, a plurality of channels 164, e.g., 12 channels 164, aka fluid sloping slots, inset radially and equidistantly about the peripheral surface 165 thereof to create a series of radial fluid impinging elements. The channels 164 extend from a position between the apex end 162 and the downstream end 163. The channels 164 comprise a floor 167, with the floor 167 adjoining a virtual frusto-conical volume that is oriented in an inverted fashion to the substantial conical shape of the peripheral surface 165 of the jet-fragmenting device 160.

In a preferred realization, the revolution angle (angle between the axis and the face) of the virtual frusto-conical volume is between ten (10) and twenty (20) degrees. According to an embodiment, the angle is about fifteen (15) degrees.

According to a preferred embodiment well adapted to water, the jet-fragmenting device 160 has apex end 162 having a radius of between 0.02 and 0.04 inches, and preferably about 0.03 inches. The channels 164 have a length ranging between 10% and 40% of the overall length of the jet-fragmenting device 160, and preferably equal to about 20% of the overall length of the jet-fragmenting device 160. The channels 164 have a width ranging between 8 and 20 degrees, and preferably of about 12.5 degrees and a maximum depth ranging between about 40% and 50% of the diameter of the jet-fragmenting device 160 at its downstream end 163. The channels 164 are sloping to the peripheral surface 165 with an angle ranging between 10 and 20 degrees, and preferably of about 15 degrees with respect to the longitudinal axis A of the jet-fragmenting device. The width of the channels 164 is designed to create radial fins 166, with the width ranging between 12 and 25 degrees, and being preferably about 17.5 degrees of arc. The preferred length of the jet-fragmenting device 160 ranges between one and a half (1.5) and three (3) inches, and is preferably 2.01 inches. The diameter of its downstream end 163 ranges between a half (0.5) and one (1) inch, and is preferably about 0.73 of an inch. In the depicted realization featuring the preferred dimensions listed hereinbefore, the maximum depth of the channels 164 is reached at the downstream end 163, being about 0.32) of an inch from the top of the fins 166. The peripheral surface 165 of the jet-fragmenting device 160 is gradually sloping from the proximal end 162 at about zero (0) degree to the downstream end 163 at between 10 and 25 degrees, and preferably about 15 degrees with respect to the longitudinal axis A, as shown in FIG. 10B. The jet-fragmenting device 160 is preferably made from a material that is resistant to abrasion and corrosion such as stainless steel.

According to embodiments, the number of channels 164 ranges between eight (8) and twenty (20), and preferably between ten (10) and fifteen (15), and with the arc of the channels 164 and of the fins 166 being adapted accordingly.

According to an embodiment, the diameter of the peripheral surface 165 of the jet-fragmenting device 160 is non-constant. According to an embodiment, the diameter of the peripheral surface 165 substantially follows an exponential function with a base greater than one (1), with the slope increasing with the increase in the distance of reference of the circumference relative to the apex end 162.

To hold the jet-fragmenting device, the arms 144, 148 of the holding structure 149 provide an opening in-between at an angle that substantially follows the average angle of the jet-fragmenting device 160, wherein the average angle is established using the maximum diameter of the jet-fragmenting device 160 at the downstream end 163 and the total length of the jet-fragmenting device 160. According to alternative embodiments, the value of half of the arm angle, aka angle between the arms 144, 148, is between about ninety percent (90%) and one-hundred and fifteen percent (115%) of the average slope of the peripheral surface 165 of the jet-fragmenting device 160.

The long-range low-dispersion droplets generating injecting assemblies 140 are devised to generate droplets having an average diameter ranging from 600 to 1000 microns, and preferably droplets having an average diameter of 800 microns, and are combined to project 90% of the generated fluid stream within a 15 feet diameter target zone at a distance of about 100 feet with the assistance of the air stream.

This particular arrangement of the droplets generating injecting assemblies 140 is characteristic of the applications contemplated for the fire-fighting apparatus 100. The small angle of diffusion of the apex end 162 of the elongated jet-fragmenting device 160 contributes to minimizing interference and kinetic energy neutralization between individual streams produced by adjacent injecting assemblies 140 in the spray assembly 150 as well as meeting the low-dispersion long-range specifications of fire-fighting apparatus 100.

As stated in the foregoing description of the fire-fighting apparatus 100, the dispersion pattern and efficient range of the multiphase fire-fighting fluid steam downstream of the droplets generating injecting assemblies 140, 140' can be modified by the user according to requirements defined by the fire-fighting task to be performed. A flap system 180, depicted in the exploded assembly view of FIG. 11, is operable by the user to direct the flaps 130 and thereby configure the nozzle 132 in a more or less converging configuration.

Figure 11:
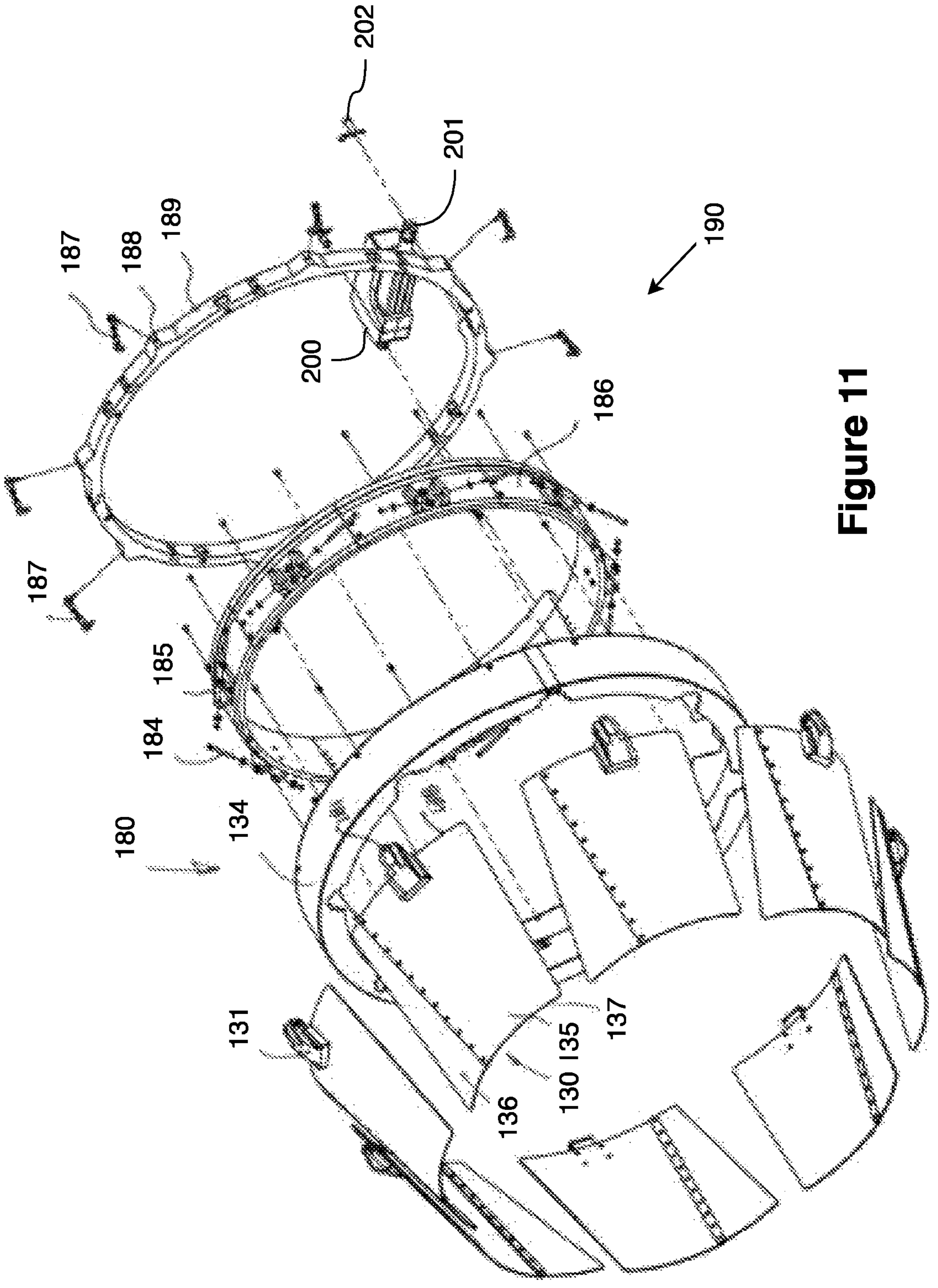
FIG. 11 is an exploded isometric view of a fluid-deflecting flap system according to an embodiment.
Figure 12:
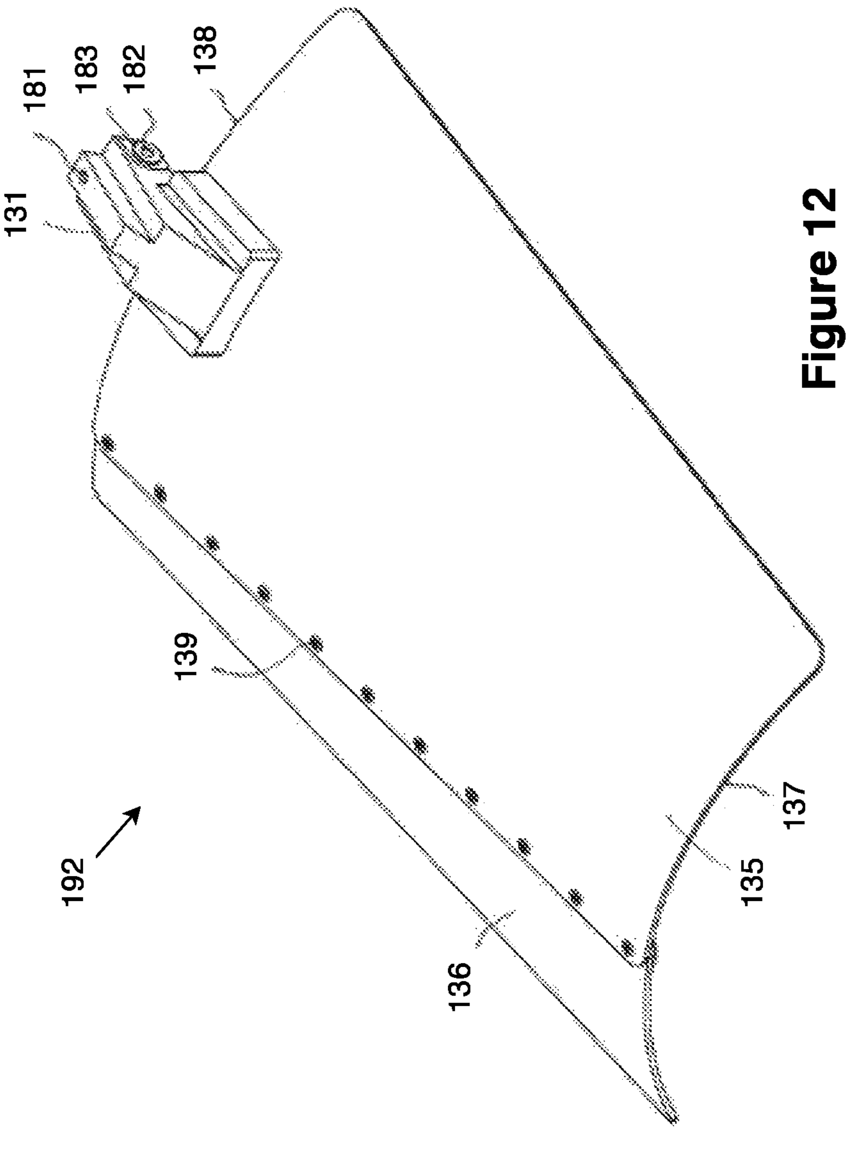
FIG. 12 is a downstream, aka front, isometric view of one flap assembly of the flap system of FIG. 11.

Referring to FIG. 11, the flap system 180 comprises a plurality, e.g., eight (8), stream deflecting flaps 130 each comprising a substantially rigid trapezoidal plate 135 and a coextending adjacent substantially flexible part 136 assembled thereto using fasteners such as rivets 139 (see details in FIG. 12). The flexible part 136 is shaped and adapted to close a gap between the plates 135 of the flaps 130, whereby the flap system 180 may maintain a closed frusto-conical configuration regardless of angular position of the flaps 130. The flexible part 136 is preferably made form an elastomeric material such as a low hardness urethane providing smooth transition and fluid tight overlap between flaps 130, with the smooth transition being maintained regardless of weather and operating conditions such as cold weather and ice forming conditions. According to a preferred realization, the urethane hardness has a value of about 95A on the Shore Hardness Scale.

The plate 135 of the flap system 180 defines a trapezoidal surface having a curvilinear upstream edge 138 and a curvilinear downstream edge 137 narrower than the upstream edge 138, and having curvature angle less that the upstream edge 138, whereby a flap 130 can form a frusto-conical funnel surface configuration having a generally circular upstream inlet edge 138 and a generally circular downstream edge 137 of a smaller diameter. The upstream edges 138 are adapted to match the diameter of the peripheral ring 123 of typically about 32 inches with no overlap, since the flexible parts 136 are providing fluid tightness therebetween. The smaller diameter at the outlet 133 is user adjustable between a maximum of about 32 inches providing no converging and a minimum of about 26 inches to cause maximum converging and deflection of the multiphase fire-extinguishing stream.

In the smaller diameter configuration, the downstream edges 137 are positioned substantially adjacent to each other. To enable configuring a larger diameter at the outlet 133, gaps between the plates 135 are filled by the flexible parts 136 smoothly slipping over the interior face of the neighbor plate 135 while the inclination of the flaps 130 is being adjusted.

Still referring to FIG. 11 and additionally to FIG. 12, the flap system 180 comprises a plurality of flap assemblies 192 comprising hinges 131 having a top threaded hole 181 and a bore 182 provided with bushings 183 adapted to receive a pin 184 to assemble the hinge 131 to the U bracket 185. Thereby, each plate 135 is hingedly and pivotally assembled to a fixed support ring 186 itself mounted to the outer surface of the ring 123 at the outlet 122.

An actuating system 190 comprises the links 187 having an end screwed into the threaded hole 181 and a second end screwed in the reversely threaded hole 188 of a rotatable ring 189, the latter rotatably mounted concentrically on top of the fixed support ring 186. The rotatable ring 189 smoothly rotates on the surface of the support ring 186 extending between U brackets 185 thanks to eight (8) bearing wheels. The flaps 130 are connected to the rotatable ring 189 through links 187 so that radial rotation of the rotatable ring 189 causes each link 187 to pull the top of the respective hinge 131, in turn causing the flaps 130 to simultaneously pivot about the axis of the pin 184 to adjust the inclination of the flaps 130. Rotation of the rotatable ring 189 in one direction causes the flaps 130 to pivot in one direction to close the outlet 133 of the frusto-conical nozzle 132 while rotation of the rotatable ring 189 in the opposite direction causes the nozzle outlet 133 to be enlarged. Thereby, control of the rotatable ring 189 provides control of the inclination of the flaps 130.

A push-pull action of a linear actuator 200 having a shaft 201 connected to the rotatable ring 189 through the pin 202 enables rotation of the rotatable ring 189 over an angular range of about 0 to 30 degrees. Preferably, the linear actuator 200 is electrically driven using an electrical control (not shown), which can be used by a user to selectively adjust the inclination of the flaps 130 and thus configure the frusto-conical shape of the nozzle 132 and the diameter of the outlet 133 of the fire-fighting apparatus 100. The user can hence easily and reliably selectively control the deflection of the fire-extinguishing stream of the multiphase fire-fighting fluid exiting the fire-fighting apparatus 100 by configuring the dispersion pattern, and thus controlling the range thereof.

In use, the pump P supplies fluid at high-pressure and high-flow to the fluid inlet 124 in the fire-fighting apparatus 100, in turn supplying the manifold 153 through the feed pipe 155 with the fluid being equally distributed through the tubular sections 154 up to the fluid inlet bore 142 of the droplets generating injecting assemblies 140, 140'. A fluid jet is projected from the fluid outlet 143 and hits the jet-fragmenting device 160, thereby converting the jet stream into smaller jets and droplets. When the foam injecting assemblies 140' are used with a foam-forming fluid, the fluid is further fragmented and mixed with air by the grid plate 170 to generate a foam precursor fluid. The multiphase fluid resulting from the mix downstream of the injecting assemblies 140, 140' has high velocity thanks in part to the kinetic energy of the air stream produced by the blower 110. The turbulence of the air stream helps further splitting remaining jets into droplets to achieve the desired size range, dispersion and projection range. The flaps 130 may be adjusted, in addition to the fluid pressure and the flow control, to further control the range and direction of the fire-extinguishing stream at the outlet 133, to take into account factors such as wind effects, obstacles and distance to the target.

It can thus be easily appreciated that the above-described non-restrictive illustrative embodiments of the user configurable long-range fire-fighting apparatus and its components comprising the modular spray assembly, the long-range low-dispersion droplet injecting assemblies and the user configurable flap system according to disclosed matter obviate, alone and in combination, numerous limitations and drawbacks of the prior art fire-fighting apparatuses, systems and devices with some being discussed hereinbefore.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A fire-fighting apparatus comprising:

a housing comprising an upstream fluid inlet and a downstream fire-extinguishing stream outlet and a hollow housing body therebetween, wherein the housing provides passage to a fluid stream traveling at high velocity;

a spray assembly concentrically mounted to the housing, the spray assembly comprising:

a fluid inlet connected to a source of fluid outside the housing; and a plurality of injecting assemblies fluidly connected to the fluid inlet and designed for breaking down an inflow of the fluid into droplets and projecting the droplets of the fluid within the air stream in a fire-extinguishing stream, at least one of the injecting assemblies comprising:

a fluid outlet;

a base plate through which extends the fluid outlet;

a holding structure mounted to the base plate and extending downstream therefrom, and a unibody jet-fragmenting device mounted to the holding structure facing the stream of fluid exiting the fluid outlet, wherein the unibody jet-fragmenting device comprises:

an elongated conical body having a peripheral surface;

an apex facing the fluid outlet;

a base at an end of the jet-fragmenting device which is opposite the apex; and a series of channels inset in the peripheral surface from the base to an intermediary position between the apex and the base;

wherein the peripheral surface of the jet-fragmenting device has a non-constant diameter defining a slope varying along the peripheral surface, the slope increasing from an apex slope about the apex to a base slope about the base of the jet-fragmenting device;

wherein the channels comprise a floor, wherein the floors of the channels are adjoining a virtual frusto-conical volume;

wherein the virtual frusto-conical volume is oriented invertedly to the conical body of the peripheral surface.

2. The fire-fighting apparatus of claim 1, wherein the jet-fragmenting device comprises a base, and a fixing component located at the base.

3. The fire-fighting apparatus of claim 1, wherein the holding structure comprises a pair of arms and a transversal component connecting the arms distant from the fluid outlet.

4. The fire-fighting apparatus of claim 3, further comprising a grid plate mounted to the holding structure downstream to the jet-fragmenting device.

5. The fire-fighting apparatus of claim 3, wherein the unibody jet-fragmenting device comprises an elongated conical body having a peripheral surface, and wherein the peripheral surface of the jet-fragmenting device has an average slope and wherein the arms have an arm angle in-between with half of the arm-angle being between 90% and 115% of the average slope of the peripheral surface of the jet-fragmenting device.

* * * * *